US012607978B2

(12) United States Patent
Sawaoka

(10) Patent No.: US 12,607,978 B2
(45) Date of Patent: Apr. 21, 2026

(54) NUMERICAL CONTROL SYSTEM AND INTERFERENCE CHECKING ASSISTANCE METHOD

(71) Applicant: FANUC CORPORATION, Yamanashi (JP)

(72) Inventor: Hiroki Sawaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 479 days.

(21) Appl. No.: 18/041,060

(22) PCT Filed: Aug. 26, 2021

(86) PCT No.: PCT/JP2021/031376
§ 371 (c)(1),
(2) Date: Feb. 8, 2023

(87) PCT Pub. No.: WO2022/045253
PCT Pub. Date: Mar. 3, 2022

(65) Prior Publication Data
US 2023/0288903 A1     Sep. 14, 2023

(30) Foreign Application Priority Data
Aug. 31, 2020     (JP) ................................. 2020-146207

(51) Int. Cl.
*G05B 19/406*          (2006.01)
*G05B 19/408*          (2006.01)
(52) U.S. Cl.
CPC ......... *G05B 19/406* (2013.01); *G05B 19/408*
(2013.01); *G05B 2219/35316* (2013.01)
(58) Field of Classification Search
CPC ................ G05B 19/406; G05B 19/408; G05B
2219/35316

(Continued)

(56) References Cited

U.S. PATENT DOCUMENTS

2015/0045941 A1*   2/2015   Mitsuhashi  ........  G05B 19/4061
                                                        700/178
2016/0299491 A1*   10/2016   Kobayashi  .........  G05B 19/4061
                         (Continued)

FOREIGN PATENT DOCUMENTS

CN          1609740 A      4/2005
CN        111052015 A      4/2020
                      (Continued)

OTHER PUBLICATIONS

International Search Report issued in PCT/JP2021/031376; mailed Nov. 9, 2021.

*Primary Examiner* — Jigneshkumar C Patel
(74) *Attorney, Agent, or Firm* — Studebaker Brackett PLLC

(57)          ABSTRACT

A numerical control apparatus 3 comprises: a pulse generation unit 34 that moves a plurality of machine elements of a machine tool 2 along a plurality of control axes on the basis of a movement pulse for the machine tool 2; an interference checking unit 36 that performs interference checking calculation for a plurality of interference-checking subject sets; and an interference checking assistance device 5 that assists the interference checking calculation. The interference checking assistance device 5 comprises: a first storage unit 51 that stores machine element-control axis linkage information; a second storage unit 52 that stores individual axis subordinate relationship information; and a checking subject set extraction unit 54*a* that, on the basis of the movement pulse, the machine element-control axis linkage information, and the individual axis subordinate relationship information, extracts one or more checking subject sets from among all combinations of the machine elements.

6 Claims, 11 Drawing Sheets

(58) Field of Classification Search
 USPC ............................................................ 700/1
 See application file for complete search history.

(56) References Cited

U.S. PATENT DOCUMENTS

| 2018/0164782 | A1* | 6/2018 | Koga | G05B 19/19 |
| 2021/0165392 | A1* | 6/2021 | Oonishi | G05B 19/4183 |

FOREIGN PATENT DOCUMENTS

| JP | H06-083422 A | | 3/1994 |
| JP | H09-230918 A | | 9/1997 |
| JP | H10-232706 A | | 9/1998 |
| JP | 2000284819 A | * | 10/2000 |
| JP | 2007-018145 A | | 1/2007 |
| JP | 6066041 B2 | | 1/2017 |
| JP | 2019-057262 A | | 4/2019 |

* cited by examiner

| CONTROL AXIS | | AXIS | MACHINE | MACHINE ELEMENT | COMBINATION | PRIORITY |
|---|---|---|---|---|---|---|
| RECTILINEAR AXIS | ROTARY AXIS | STROKE | ELEMENT | RANKING | | |
| 1 | 2 | 4 | 1 | 3 | 1-3 | 6 |
| | | 2 | 2 | 2 | 2-3 | 5 |
| | | | | | 1-2 | 4 |
| 3 | | 3 | 3 | 4 | | |
| 4 | 5 | 1 | 4 | 1 | 3-4 | 3 |
| | | 3 | | | 1-4 | 2 |
| | | | | | 2-4 | 1 |

FIRST MACHINE ELEMENT

SECOND MACHINE ELEMENT

THIRD MACHINE ELEMENT

FOURTH MACHINE ELEMENT

| AXIS PAIR | RELATIVE AXIS STROKE | COMBINATION OF MACHINE ELEMENT | PRIORITY |
|---|---|---|---|
| 2-3 | 1 | | |
| 3-4 | 2 | | |
| 1-4 | 3 | 1-3 | 3 |
| 1-2 | 4 | 1-2 | 2 |
| 1-3 | 5 | | |
| 2-4 | 6 | 2-3 | 1 |

FIRST MACHINE ELEMENT

SECOND MACHINE ELEMENT

THIRD MACHINE ELEMENT

| CONTROL AXIS | MACHINE ELEMENT | VELOCITY VECTOR | PRE-MOVEMENT POSITION VECTOR |
|---|---|---|---|
| 1 | 1 | v1 | r1 |
| 2 | 2 | v2 | r2 |
| 3 | 3 | v3 | |
| 4 | | | r3 |

| COMBINATION OF MACHINE ELEMENTS | RELATIVE VELOCITY VECTOR | RELATIVE POSITION VECTOR | REDUCTION RATE PARAMETER | PRIORITY |
|---|---|---|---|---|
| 1-2 | v1-v2=(0,0,1) | r1-r2=(0,0,-1) | 1 | 1 |
| 1-3 | v1-v3=(0,2,0) | r1-r3=(0,0,1) | 0 | 2 |
| 2-3 | v2-v3=(1,0,0) | r2-r3=(1,0,0) | -1 | 3 |

FIRST MACHINE ELEMENT

SECOND MACHINE ELEMENT

THIRD MACHINE ELEMENT

FIG. 9

| CHECK TARGET SET | SECOND AND THIRD MACHINE ELEMENTS | SECOND AND FOURTH MACHINE ELEMENTS | FIRST AND THIRD MACHINE ELEMENTS | ... |
|---|---|---|---|---|
| PRIORITY | 1 | 2 | 3 | ... |

NUMERICAL CONTROL SYSTEM AND INTERFERENCE CHECKING ASSISTANCE METHOD

TECHNICAL FIELD

The present disclosure relates to a numerical control system and an interference check assistance method.

BACKGROUND ART

A numerical controller moves, based on a numerical control program created in advance, a plurality of machine elements (for example, tools, tables, and jigs for holding workpieces) constituting a machine tool along a plurality of control axes to perform machining on a workpiece. Further, the numerical controller has an interference check function that performs interference check computation in parallel during machining by the machine tool to check whether the machine elements of the machine tool are interfering with each other (for example, see Patent Document 1).

Patent Document 1: Japanese Patent No. 6066041

DISCLOSURE OF THE INVENTION

Problems to be Solved by the Invention

By the way, a conventional numerical controller performs interference check computation using shape information on shape of machine elements, position information on positions of the machine elements, and attitude information on attitudes of the machine elements to determine whether two machine elements constituting a predetermined check target set are interfering with each other. In the conventional numerical controller, since it is necessary to perform such interference check computation on a plurality of check target sets, it may take a time.

Therefore, as the number of check target sets increases, there is a possibility that the numerical controller cannot completely perform the interference check computation on all of the check target sets within a control period of the machine tool. Moreover, for this reason, the interference between the machine elements may not be detected at appropriate timing.

The present disclosure has been made in view of the above problems, and is to provide a numerical control system and an interference check assistance method that assist interference check computation in a numerical controller such that the interference check computation can be completed in a short time.

Means for Solving the Problems

An aspect of the present disclosure provides a numerical control system including: a numerical controller that causes a plurality of machine elements of a machine tool to move along a plurality of axes based on a movement command and performs an interference check computation between two machine elements that are combined by a predetermined check target set; and an interference check assistance device that assists the interference check computation, the interference check assistance device including a first storage unit that stores first information for linking each of the axes in the machine tool with a machine element, which moves along a corresponding axis, among the plurality of machine elements, a second storage unit that stores second information for defining dependency between the axes in the machine tool, and a check target set extraction unit that extracts one or more of the check target set from all combinations of the plurality of machine elements, based on the movement command, the first information, and the second information.

Another aspect of the present disclosure provides an interference check assistance method in which a numerical controller assists an interference check computation, the numerical controller being configured to cause a plurality of machine elements of a machine tool to move along a plurality of axes based on a movement command and to perform an interference check computation between two machine elements that are combined by a check target set, the method including: acquiring the movement command, first information for linking each of the axes in the machine tool with a machine element, which moves along a corresponding axis, among the plurality of machine elements, and second information for defining dependency between the axes in the machine tool; and extracting one or more of the check target set from all combinations of the plurality of machine elements, based on the movement command, the first information, and the second information.

Effects of the Invention

According to aspects of the present disclosure, the check target set extraction unit extracts one or more check target sets from all the combinations of the plurality of machine elements constituting the machine tool, based on the movement command in the numerical controller, the first information for linking each of the axes in the machine tool with the machine element moving along such an axis among the plurality of machine elements, and the second information for defining the dependency between the axes in the machine tool. Thus, it is possible to extract the check target set by excluding the combination of the machine elements that obviously do not interfere (for example, the combination of the machine elements moving together along the axes based on the movement command) from all the combinations of the plurality of machine elements. Further, the numerical controller causes the plurality of machine elements to move along the plurality of axes based on the movement command, and performs the interference check computation on the check target set extracted by the check target set extraction unit. According to the aspects of the present disclosure, since the check target set subjected to the interference check computation can be narrow down to only the combination of the non-obvious machine elements that do not interfere, the interference check computation can be completed in a short time compared with a case where the numerical controller performs the interference check computation on all the combinations.

BRIEF DESCRIPTION OF THE DRAWINGS

FIG. 9 is a diagram showing an example of interference check assistance information generated by an interference check assistance device.

PREFERRED MODE FOR CARRYING OUT
THE INVENTION

First Embodiment

A numerical control system according to a first embodiment of the present disclosure will be described below with reference to the drawings.

Figure 1:
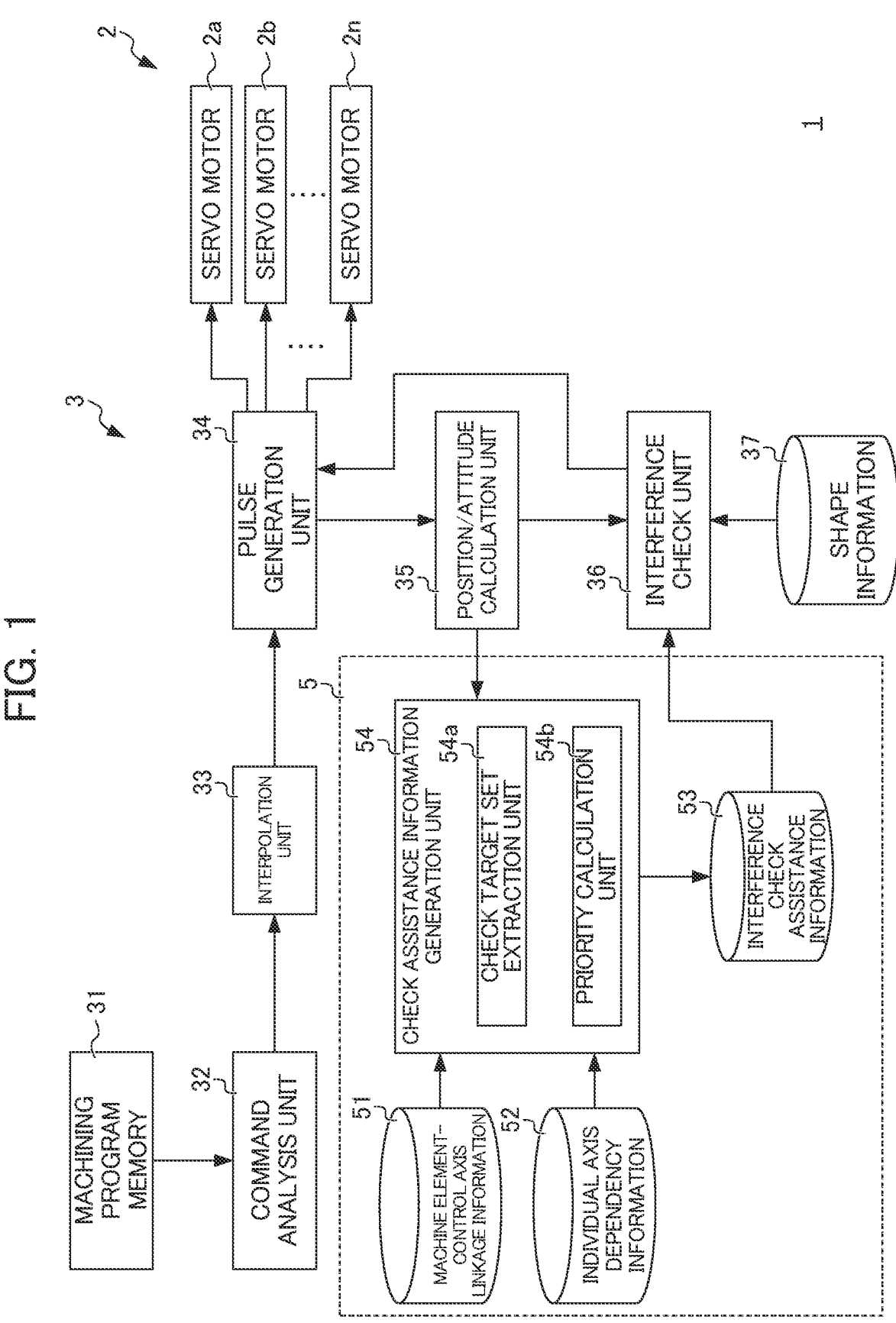
FIG. 1 is a schematic diagram of a numerical control system according to a first embodiment of the present disclosure.

FIG. 1 is a schematic diagram of a numerical control system 1 according to the present embodiment.

The numerical control system 1 includes a machine tool 2 and a numerical controller (CNC) 3 that controls the machine tool 2.

The machine tool 2 includes a plurality of machine elements, for example, a tool, a table, a support for supporting the tool, and a jig for holding a workpiece, having a predetermined three-dimensional shape, and a plurality of servo motors $2a$, $2b$, . . . , and $2n$ that moves the machine elements along a plurality of control axes. The machine tool 2 drives the plurality of servo motors $2a$, . . . , and $2n$ based on movement pulses transmitted from the numerical controller 3, and machines a workpiece (not shown) by moving the plurality of machine elements along the plurality of control axes. Here, examples of the machine tool 2 include a lathe, a drilling machine, a milling machine, a grinding machine, a laser processing machine, and an injection molding machine, but are not limited thereto.

The numerical controller 3 is a computer configured by hardware including a computation processing unit such as a CPU (Central Processing Unit), an auxiliary storage unit such as an HDD (Hard Disk Drive) or an SSD (Solid State Drive) for storing various programs, a main storage unit such as a RAM (Random Access Memory) for storing data temporarily required for execution of the programs by the computation processing unit, an operation unit such as a keyboard for an operator to perform various operations, and a display unit such as a display for displaying various information to the operator.

The numerical controller 3 uses the configurations of hardware to implement various functions of a machining program memory 31, a command analysis unit 32, an interpolation unit 33, a pulse generation unit 34, a position/ attitude calculation unit 35, an interference check unit 36, a shape storage unit 37, and an interference check assistance device 5.

The machining program memory 31 stores a numerical control program including a command to move (including translational movement and rotational movement) the machine elements of the machine tool 2 along the control axes. The numerical control program is written in a predetermined program language (for example, a G code).

The command analysis unit 32 reads and analyzes the numerical control program, which is stored in the machining program memory 31, by each block, and generates movement command data for commanding movement along the control axis of the machine tool 2 based on the analysis result. The command analysis unit 32 transmits the generated movement command data to the interpolation unit 33.

The interpolation unit 33 generates, based on the movement command data transmitted from the command analysis unit 32, interpolated data obtained by interpolation calculation of points on a command path at a predetermined interpolation period. The interpolation unit 33 transmits the generated interpolated data to the pulse generation unit 34.

The pulse generation unit 34 generates, based on the interpolated data transmitted from the interpolation unit 33, movement commands for the machine tool 2, that is, movement pulses for the servo motors $2a$, . . . , and $2n$ of the machine tool 2 for each of the aforementioned interpolation periods. The pulse generation unit 34 inputs the movement pulses generated as described above to the servo motors $2a$, . . . , and $2n$ to move the plurality of machine elements of the machine tool 2 along the plurality of control axes. Further, when it is determined based on interference check computation (to be described below) in the interference check unit 36 that any one of the plurality of machine elements interferes, the pulse generation unit 34 stops the generation of the movement pulse and the input to the machine tool 2 so as to prevent such interference beforehand.

In addition, the pulse generation unit 34 generates the movement pulse for each interpolation period based on the interpolated data as described above, and transmits the movement pulse scheduled to be input to the machine tool 2 in the current interpolation period to the position/attitude calculation unit 35 before inputting it to the machine tool 2.

The position/attitude calculation unit 35 calculates, based on the movement pulse transmitted from the pulse generation unit 34 every interpolation period, an axis stroke vector regarding an axis stroke per unit time (for example, per interpolation period) of each control axis when each of the control axes moves based on the movement pulse, a pre-movement position vector regarding the position of each of the machine elements before each of the control axes moves based on the movement pulse, a post-movement position vector regarding the position of each of the machine elements after each of the control axes moves based on the movement pulse, and post-movement attitude information regarding an attitude of each of the machine elements after each of the control axes moves based on the movement pulse. The position/attitude calculation unit 35 transmits the calculated axis stroke vector for each control axis and the pre-movement position vector for each machine element to the interference check assistance device 5. Further, the position/attitude calculation unit 35 transmits the calculated post-movement position vector and post-movement attitude information for each machine element to the interference check unit 36.

A direction and a norm of the axis stroke vector calculated by the position/attitude calculation unit 35 are defined as follows. When the control axis is a rectilinear axis along which the machine element translates along an axial line thereof, a direction of the axis stroke vector is parallel to the control axis, and a norm of the axis stroke vector is equal to a movement distance [mm] per unit time along the axial line of the control axis. Further, when the control axis is a rotary axis along which the machine element rotates around an axial line thereof, an angular velocity vector of the control axis is used as an axis stroke vector. In other words, when the control axis is a rotary axis, a direction of the axis stroke vector is parallel to the control axis, and a norm of the axis stroke vector is equal to a rotation angle [rad] per unit time of the control axis. In the following description, the norm of the axis stroke vector is also simply referred to as an "axis stroke".

The shape storage unit 37 stores shape information regarding a shape of each of the plurality of machine elements constituting the machine tool 2. As described above, when the movement pulse having the same interpolation period as the movement pulse input to the machine tool 2 from the pulse generation unit 34 is input to the position/attitude calculation unit 35, even if the interference check unit 36 cannot complete the interference check computation within the interpolation period, the shape information stored in the shape storage unit 37 is preferably added with a slight margin such that interference does not occur immediately. In other words, the shape information stored in the shape storage unit 37 is preferably created based on machine elements that are slightly larger than the actual machine elements.

When the movement pulse generated by the pulse generation unit 34 is continuously input to the machine tool 2 as described above, the interference check unit 36 performs the interference check computation on a plurality of check target sets to determine whether interference occurs between the plurality of machine elements constituting the machine tool 2. Here, the check target set is configured by a combination of two machine elements selected from the plurality of machine elements constituting the machine tool 2. Therefore, when the total number of machine elements constituting the machine tool 2 is N, the total number of check target sets is N (N−1)/2.

More specifically, the interference check unit 36 performs the interference check computation according to a known interference check algorithm (for example, a separating axis method), based on the post-movement position vector and the post-movement attitude information transmitted from the position/attitude calculation unit 35 every interpolation period, interference check assistance information generated every interpolation period according to a procedure described below by the interference check assistance device 5, and the shape information stored in shape storage unit 37, and determines whether the plurality of machine elements constituting the machine tool 2 interfere with each other when the movement pulse generated by the pulse generation unit 34 is continuously input to the machine tool 2. When determining by the interference check computation that the interference occurs, the interference check unit 36 notifies the pulse generation unit 34 of the fact, and stops the generation of the movement pulse and the input to the machine tool 2 before the interference occurs.

The interference check assistance device 5 includes a first storage unit 51, a second storage unit 52, a third storage unit 53, and a check assistance information generation unit 54, and uses these components to generate interference check assistance information, which is information for assisting the interference check computation in the interference check unit 36.

The first storage unit 51 stores a machine element-control axis linkage information, in which each of the control axes in the machine tool 2 is linked with the machine element that moves along the control axis related to the movement of each of the control axes, in an arbitrary format such as a machine configuration tree or a table. In the present embodiment, a case will be described in which the first storage unit 51 stores the machine element-control axis linkage information in a machine configuration tree format as exemplified in FIG. 3 which will be described below.

The second storage unit 52 stores individual axis dependency information, in which dependency between the control axes in the machine tool 2 is defined, in an arbitrary format such as a machine configuration tree or a table. In the present embodiment, a case will be described in which the second storage unit 52 stores the individual axis dependency information in a machine configuration tree format as exemplified in FIG. 3 which will be described below.

Next, specific examples will be described with reference to FIGS. 2 and 3 in which the machine element-control axis linkage information and the individual axis dependency information are stored in the storage units 51 and 52, respectively.

Figure 2:
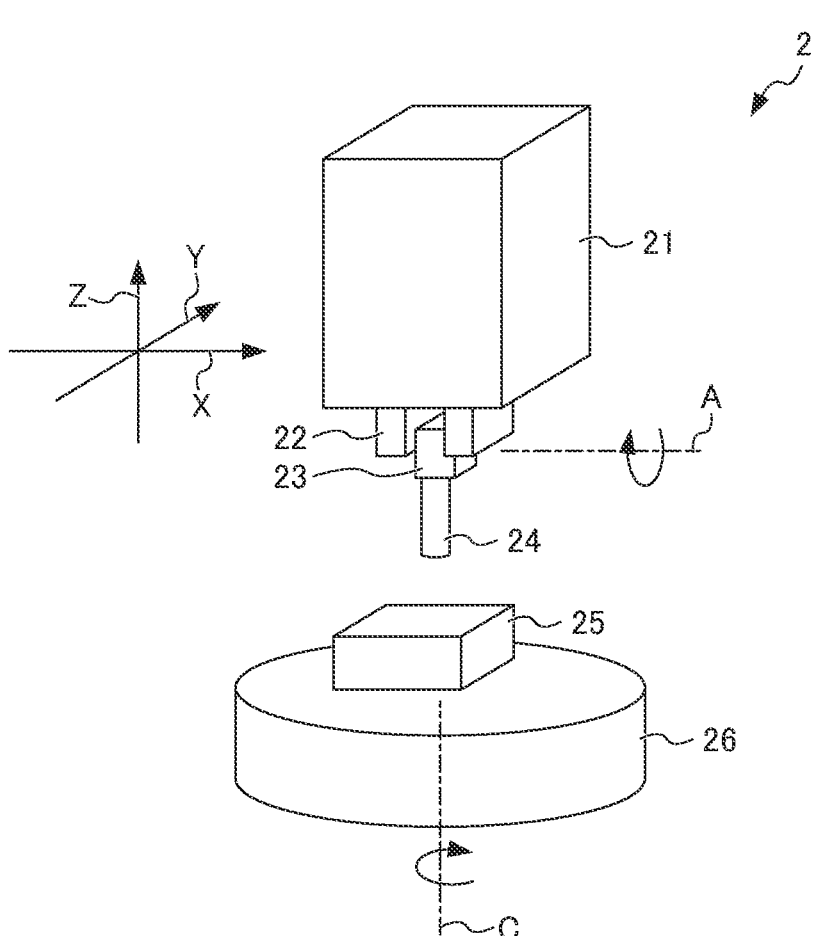
FIG. 2 is a diagram showing an example of a machine tool.

FIG. 2 is a diagram showing an example of the machine tool 2. The machine tool 2 shown in FIG. 2 can move six machine elements 21, 22, 23, 24, 25, and 26 along five control axes X, Y, Z, A, and C. The fifth machine element 25 is a jig that supports a workpiece (not shown), and the sixth machine element 26 is a table that supports the fifth machine element 25. These fifth machine element 25 and sixth machine element 26 can be rotated around the control axis C extending in a vertical direction, for example. The fourth machine element 24 is a tool that machines the workpiece supported by the fifth machine element 25. The third machine element 23 is a support that supports the fourth machine element 24 at a tip thereof. The second machine element 22 is a support that supports a base end of the third machine element 23 so as to be rotatable around the control axis A extending along a horizontal plane. The first machine element 21 is a support that supports the second machine element 22 so as to be movable in parallel along the control axis Z in the vertical direction and the control axis X and the control axis Y orthogonal to each other in the horizontal plane. In other words, in the example of FIG. 2, the control axes X, Y, and Z are rectilinear axes, and the control axes A and C are rotary axes.

In other words, in the machine tool 2 shown in FIG. 2, the fifth machine element 25 and the sixth machine element 26 rotate integrally along the control axis C. In addition, the first machine element 21, the second machine element 22, the third machine element 23, and the fourth machine element 24 rotate integrally along the control axes X, Y, and Z, and the third machine element 23 and the fourth machine element 24 rotate integrally along the control axis A.

Figure 3:
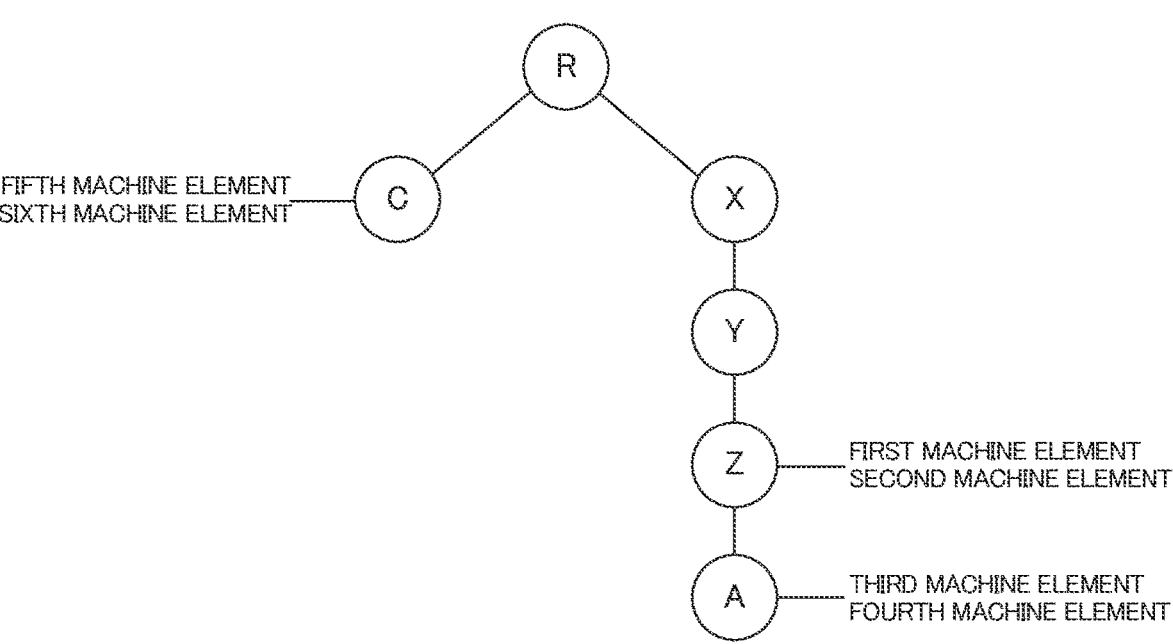
FIG. 3 is a diagram showing a display example in a machine configuration tree of machine element-control axis linkage information and individual axis dependency information.

FIG. 3 is a diagram showing a display example in a machine configuration tree of the machine element-control axis linkage information and the individual axis dependency information in the machine tool 2 shown in FIG. 2. In the machine tool 2 shown in FIG. 2, the control axis C can move independently of the control axes X, Y, Z, and A. Therefore, as shown in the machine configuration tree of FIG. 3, the control axis C and the control axes X, Y, Z, and A are dependent on a route R, independently. In the machine tool 2 shown in FIG. 2, the control axis A moves when the control axes X, Y, and Z move, but the control axes X, Y, and Z do not move even when the control axis A moves. In other words, the control axis A is subordinate to the control axes X, Y, and Z. Therefore, as shown in machine configuration tree of FIG. 3, the control axis A is dependent on the control axes X, Y, and Z.

Further, since the fifth machine element 25 and the sixth machine element 26 rotate integrally along the control axis C, these machine elements 25 and 26 are linked with the control axis C as shown in the machine configuration tree of FIG. 3. Further, since the third machine element 23 and the fourth machine element 24 rotate integrally along the control axis A subordinate to the control axes X, Y, and Z, these machine elements 23 and 24 are linked with the control axis A as shown in the machine configuration tree of FIG. 3. In addition, since the first machine element 21 and the second machine element 22 rotate integrally along the control axes X, Y, and Z, these machine elements 21 and 22 are linked with the lowest subordinate control axis Z of the control axes X, Y, and Z as shown in the machine configuration tree of FIG. 3.

Returning to FIG. 1, the check assistance information generation unit 54 includes a check target set extraction unit 54a that extracts one or more check target sets from all combinations of the plurality of machine elements of the machine tool 2, and a priority calculation unit 54b that calculates a priority for the plurality of check target sets, more specifically, the plurality of check target sets extracted by the check target set extraction unit 54a. Here, the priority for the plurality of check target sets is an integer value that determines the order in which the interference check unit 36 sequentially performs the interference check computation on the plurality of check target sets. In the following description, it is assumed that the priority is lowered in ascending order from the smallest value.

The third storage unit 53 stores interference check assistance information configured by a combination of information on the check target set extracted by the check target set extraction unit 54a and information on the priority determined for each of the check target sets by the priority calculation unit 54b.

The check target set extraction unit 54a extracts one or more check target sets by excluding combinations, which do not require to execute interference check computation, from all combinations of the plurality of machine elements, based on the axis stroke of each of the control axes transmitted from the position/attitude calculation unit 35 every interpolation period, the machine element-control axis linkage information stored in the first storage unit 51, and the individual axis dependency information stored in the second storage unit 52.

First, based on the axis stroke of each of the control axis transmitted from the position/attitude calculation unit 35, the check target set extraction unit 54a specifies, as a movement control axis, the control axis to be moved by the movement pulse from the plurality of control axes. More specifically, the check target set extraction unit 54a specifies a control axis of which axis stroke (norm of an axis stroke vector) is not 0, as a movement control axis.

Thereafter, the check target set extraction unit 54a classifies the plurality of machine elements constituting the machine tool 2 into a dependent machine element group and a stationary machine element group, based on the machine element-control axis linkage information and the individual axis dependency information. The dependent machine element group is a group to which the machine elements moving together with the movement control axis belong, and the stationary machine element group is a group to which the machine elements not moving even when the movement control axis moves belong. More specifically, the check target set extraction unit 54a classifies the machine elements linked with the movement control axis and the control axis subordinate to the movement control axis into the dependent machine element group, and classifies the machine elements not belonging to the dependent machine element group among all of the machine elements into the stationary machine element group.

Here, all of the machine elements belonging to the dependent machine element group move together with the movement control axis. For this reason, combinations of the machine elements belonging to the dependent machine element group are excluded from the check target sets because of not obviously interfering even when interference check computation is not executed. Further, all machine element belonging to the stationary machine element group do not move when the movement control axis moves. For this reason, combinations of the machine elements belonging to the stationary machine element group are excluded from the check target sets because of not obviously interfering even when interference check computation is not executed. Therefore, the check target set extraction unit 54a extracts combinations of the machine elements belonging to the dependent machine element group and the machine elements belonging to the stationary machine element group, as check target sets. In other words, the check target set extraction unit 54a extracts, as check target sets, combinations excluding the combinations of the machine elements belonging to the dependent machine element group and the combinations of the machine elements belonging to the stationary machine element group from all the combinations of the plurality of machine elements. The check target set extraction unit 54a causes the third storage unit 53 to store a list of the check target sets (hereinafter, referred to as a "check target set list") extracted by the procedure described above.

A specific procedure will be described with reference to specific example of FIGS. 4A and 4B in which the check target set extraction unit 54a extracts the check target set as described above.

Figure 4A:
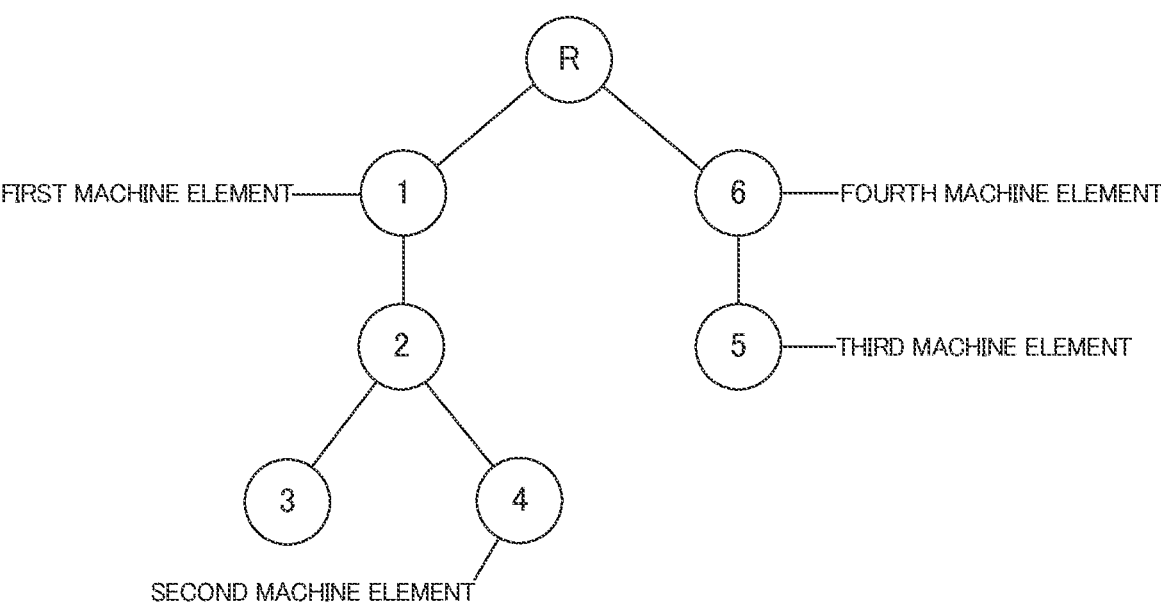
FIG. 4A is a diagram showing an example of the machine element-control axis linkage information and the individual axis dependency information.

FIG. 4A is a diagram showing an example of the machine element-control axis linkage information and the individual axis dependency information. In the example shown in FIG. 4A, the machine tool can move the first machine element, the second machine element, the third machine element, and the fourth machine element along the first control axis, the second control axis, the third control axis, the fourth control axis, the fifth control axis, and the sixth control axis. Further, in the example of the individual axis dependency information shown in FIG. 4A, the first to fourth control axes can move independently of the fifth and sixth control axes. Further, the fifth control axis is subordinate to the sixth control axis, the second to fourth control axes are subordinate to the first control axis, and the third and fourth control axes are subordinate to the first and second control axes, and the second control axis is subordinate to the first control axis. Further, in the example of the machine element-control axis linkage information shown in FIG. 4A, the first machine element is linked with the first control axis, the second machine element is linked with the fourth control axis, the fourth machine element is linked with the sixth control axis, and the third machine element is linked with the fifth control axis.

Figure 4B:
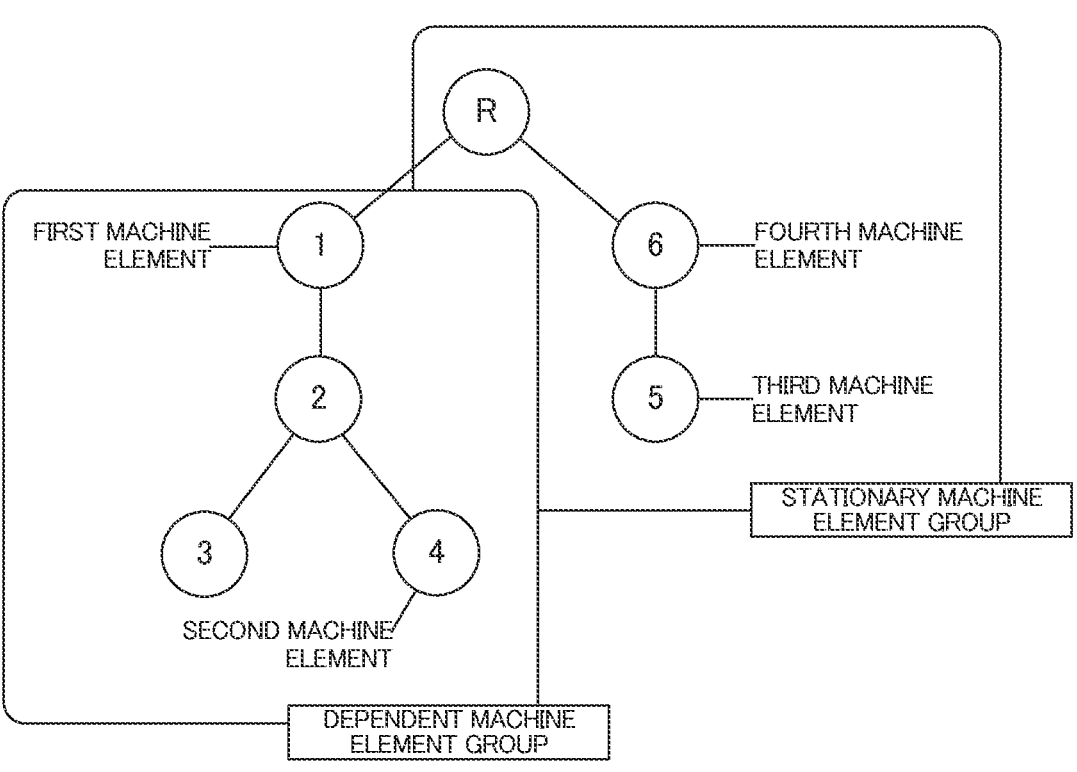
FIG. 4B is a diagram showing a case where first to fourth machine elements are classified into a dependent machine element group and a stationary machine element group under the machine element-control axis linkage information and the individual axis dependency information shown in FIG. 4A.

FIG. 4B is a diagram showing a case where the first to fourth machine elements are classified into a dependent machine element group and a stationary machine element group under the machine element-control axis linkage information and the individual axis dependency information shown in FIG. 4A. In the example of FIG. 4B, the first control axis among the first to sixth control axes is a movement control axis. As shown in FIG. 4B, the first and second machine elements are linked with the first control axis, which is the movement control axis, and the second to fourth control axes subordinate to the first control axis and are classified into a dependent machine element group, and the third and fourth machine elements not belonging to the dependent machine element group among all of the machine elements is classified into a stationary machine element group. Therefore, in the example shown in FIG. 4B, among all combinations of the first to fourth machine elements (a total of six combinations of the first and second machine elements, the first and third machine elements, the first and fourth machine elements, the second and third machine elements, the second and fourth machine elements, and the third and fourth machine elements), a total of four combinations of the first and third machine elements, the first and fourth machine elements, the second and third machine elements, and the second and fourth machine elements are extracted as check target sets.

Returning to FIG. 1, when there are a plurality of movement control axes, the check target set extraction unit 54*a* extracts, as a check target set, a union of check target sets extracted according to the above-described procedure under each of the movement control axes.

Figure 5:
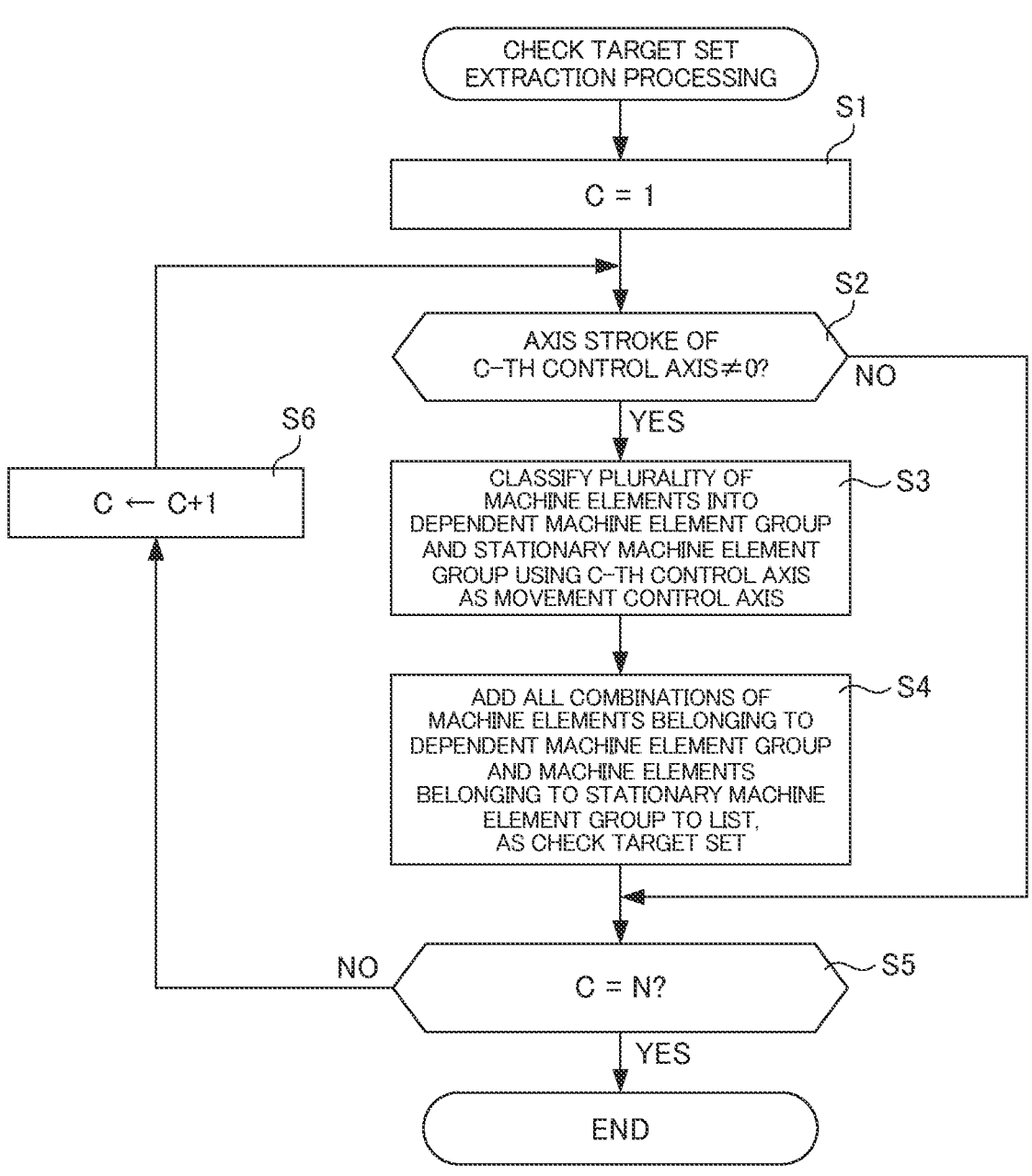
FIG. 5 is a flowchart showing a specific procedure of check target set extraction processing.

FIG. 5 is a flowchart showing a specific procedure of check target set extraction processing in the check target set extraction unit 54*a*. In the processing shown in FIG. 5, the total number of control axes is set to N (N being any integer equal to or greater than 2). The check target set extraction unit 54*a* executes the check target set extraction processing shown in FIG. 5 in response to receiving a new axis stroke from the position/attitude calculation unit 35.

First, in S1, the check target set extraction unit 54*a* sets a value of a control axis counter C to 1, and the process proceeds to S2. In S2, the check target set extraction unit 54*a* determines, based on the axis stroke for each of the control axes transmitted from the position/attitude calculation unit 35, whether an axis stroke of a C-th control axis linked by the counter C is not 0. When the check target set extraction unit 54*a* determines to be YES in S2, the process proceeds to S3, and when determining to be NO, the process proceeds to S5.

In S3, the check target set extraction unit 54*a* classifies the plurality of machine elements into a dependent machine element group and a stationary machine element group according to the above-described procedure by setting the C-th control axis as the movement control axis, and the process proceeds to S4. In S4, the check target set extraction unit 54*a* adds all combinations of the machine elements belonging to the dependent machine element group and the machine elements belonging to the stationary machine group to the check target set list in the third storage unit 53, as a check target set, and the process proceeds to S5.

In S5, the check target set extraction unit 54*a* determines whether the value of the control axis counter C is equal to the total number N of control axes. When the check target set extraction unit 54*a* determines in S5 to be NO, the process proceeds to S6, the control axis counter C is counted up only by one, and then the process returns to S2. Further, when the check target set extraction unit 54*a* determines in S5 to be YES, the check target set extraction processing shown in FIG. 5 is ended.

According to the check target set extraction processing described above, when there are a plurality of movement control axes, the union of the plurality of combinations obtained by classification of the plurality of machine elements into the dependent machine element group and the stationary machine element group under the movement control axes is extracted as a check target set.

Returning to FIG. 1, the priority calculation unit 54*b* calculates the priority for the plurality of check target sets extracted by the check target set extraction unit 54*a* in descending order from the highest interference possibility, based on the axis stroke vector of each of the control axes and the pre-movement position vector of each of the machine elements which are transmitted from the position/attitude calculation unit 35 every interpolation period and the machine element-control axis linkage information stored in the first storage unit 51. The priority calculation unit 54*b* can calculate the priority for the plurality of check target sets, based on any one of first to third priority calculation algorithms to be described below or a priority calculation algorithm obtained by a combination of these algorithms.

<First Priority Calculation Algorithm>

Under a first priority calculation algorithm, the priority calculation unit 54*b* calculates the priority for the plurality of check target sets based on the axis stroke of each of the control axes transmitted from the position/attitude calculation unit 35. More specifically, the priority calculation unit 54*b* calculates a machine element ranking for each of the machine elements linked with each of the control axes by the machine element-control axis linkage information in descending order from the control axis with the largest axis stroke. Next, the priority calculation unit 54*b* calculates the priority for the check target set including the respective machine elements in descending order from the machine element with the highest calculated machine element ranking. In order words, under the first priority calculation algorithm, the priority calculation unit 54*b* determines that there is a high possibility of interference in the check target set including the machine element linked with the control axis having a large axis stroke per unit time, and makes the priority of the check target set including these machine elements high.

By the way, a dimension of the axis stroke differs depending on the case where the control axis is the rectilinear axis and the case where the control axis is the rotary axis. More specifically, when the control axis is the rectilinear axis, the axis stroke is a movement distance, and when the control axis is the rotary axis, the axis stroke is a rotation angle. For this reason, it is not possible to directly compare the magnitude between the axis stroke with respect to the rectilinear axis and the axis stroke with respect to the rotary axis. Therefore, under the first priority calculation algorithm, the priority is calculated for the check target set including a rotary machine element which is a machine element linked with the rotary axis by the machine element-control axis linkage information, and is calculated for the check target set not including the rotary machine element. More specifically, since it is harder to notice interference on the rotary axis than on the rectilinear axis, under the first priority calculation algorithm, the priority for the check target set including the rotary machine element is set to be higher than the priority for the check target set not including the rotary machine element.

A specific procedure will be described with reference to specific example of FIG. 6 in which the priority is calculated by the first priority calculation algorithm as described above is described.

Figure 6:
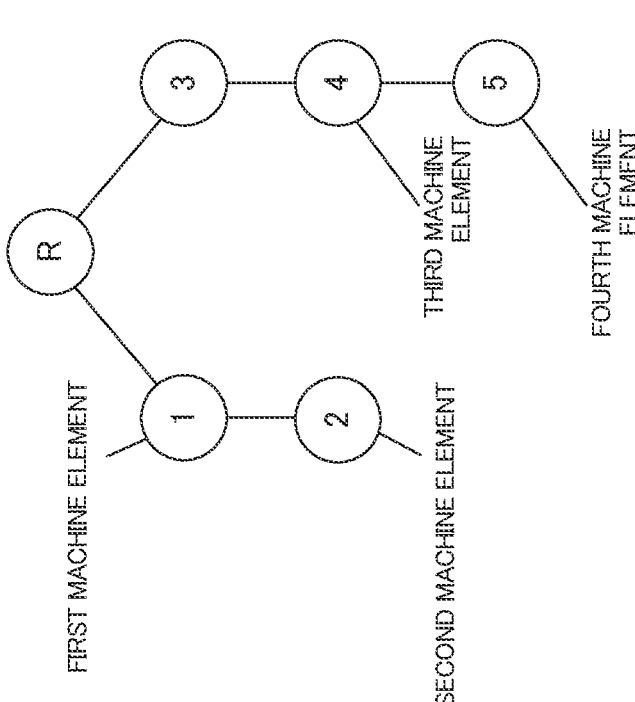
FIG. 6 is a diagram for explaining a procedure for calculating a priority using a first priority calculation algorithm.

FIG. 6 is a diagram for explaining a procedure for calculating the priority using the first priority calculation algorithm. A left side in FIG. 6 shows an example of machine element-control axis linkage information and individual axis dependency information, and a right side in FIG. 6 shows various parameters calculated by the priority calculation unit 54*b* under such a configuration.

In the example shown on the left side in FIG. 6, the machine tool can move a first machine element, a second machine element, a third machine element, and a fourth machine element along a first control axis, a second control axis, a third control axis, a fourth control axis, and a fifth control axis. In the example on the left side in FIG. 6, it is assumed that the first control axis, the third control axis, and the fourth control axis are rectilinear axes, and the second control axis and the fifth control axis are rotary axes. In the example of the individual axis dependency shown on the left side in FIG. 6, the first and second control axes can move independently of the third to fifth control axes. Further, the second control axis is subordinate to the first control axis, the fourth control axis and the fifth control axis are subordinate to the third control axis, and the fifth control axis is subordinate to the fourth control axis. In the example of the machine element-control axis linkage information shown on the left side in FIG. 6, the first machine element is linked with the first control axis, the second machine element is linked with the second control axis, the third machine element is linked with the fourth control axis, and the fourth machine element is linked with the fifth control axis. Further, FIG. 6 shows a case in which an axis stroke of the first control axis is 4, an axis stroke of the second control axis is 2, an axis stroke of the third control axis is 3, an axis stroke of the fourth control axis is 1, and an axis stroke of the fifth control axis is 3. In other words, in the example of FIG. 6, an axis stroke of the rectilinear axis increases in the order of the fourth control axis, the third control axis, and the first control axis, and an axis stroke of the rotary axis increases in the order of the second control axis and the fifth control axis.

As shown in FIG. 6, the first machine element is linked with the first control axis which is the rectilinear axis, the second machine element is linked with the second control axis which is the rotary axis, the third machine element is linked with the fourth control axis which is the rectilinear axis, and the fourth machine element is linked with the fifth control axis which is the rotary axis. In other words, the second machine element and the fourth machine element are rotary machine elements linked with the rotary axis, and the first machine element and the third machine element are rectilinear machine elements linked with the rectilinear axis. Therefore, when the rotary machine element is given a higher rank than the rectilinear machine element and the machine element ranking is calculated for each of the machine elements linked with the control axes in descending order from the control axis with the largest axis stroke, the fourth machine element is given a first rank, the second machine element is given a second rank, the first machine element is given a third rank, and the third machine element is given a fourth rank. Further, when the priority for each of the check target sets including the machine elements is calculated in descending order from the machine element with the highest machine element ranking, a combination of the second and fourth machine elements is given a first rank, a combination of the first and fourth machine elements is given a second rank, a combination of the third and fourth machine elements is given a third rank, a combination of the first and second machine elements is given a fourth rank, a combination of the second and third machine elements is given a fifth rank, and a combination of the first and third machine elements is given a sixth rank.

<Second Priority Calculation Algorithm>

Under a second priority calculation algorithm, the priority calculation unit 54*b* calculates the priority for the plurality of check target sets based on the axis stroke vector of each of the control axes transmitted from the position/attitude calculation unit 35. More specifically, the priority calculation unit 54*b* uses the axis stroke vector calculated for each of the control axes to calculate a relative axis stroke vector with respect to an axis pair configured by a combination of two control axes selected from the plurality of control axes. Here, when the total number of control axes is M, the total number of axis pairs is M (M−1)/2. Further, for example, when an axis stroke vector of an n-th control axis is vn and an axis stroke vector of an m-th control axis is vm, a relative axis stroke vector dnm with respect to an axis pair configured by the n-th control axis and the m-th control axis becomes vn−vm.

Next, the priority calculation unit 54*b* calculates a relative axis stroke (that is, a norm of the relative axis stroke vector) for all of the axis pairs. Next, the priority calculation unit 54*b* calculates a priority for each of the check target sets including the combination of the machine elements linked with each of the axis pairs by the machine element-control axis linkage information in descending order from the axis pair with the largest calculated relative axis stroke. In other words, under the second priority calculation algorithm, the priority calculation unit 54*b* determines that there is a high possibility of interference in the check target set including the combination of the machine elements linked with the axis pair having a large relative axis stroke per unit time, and makes the priority of the check target set including the combination of these machine elements high.

As described above, the dimension of the axis stroke differs depending on the case where the control axis is the rectilinear axis and the case where the control axis is the rotary axis. Therefore, the relative axis stroke vector dnm obtained by subtracting the axis stroke vector vm from the axis stroke vector vn has no physical meaning when at least one of the n-th control axis and the m-th control axis is a rotary axis. For this reason, when a rotary axis is included in all of the control axes, the priority is calculated for the check target set including the rotary machine element linked with the rotary axis, under the first priority calculation algorithm described above, and the priority is calculated only for the check target set including only the rectilinear machine element, under the second priority calculation algorithm.

A specific procedure will be described with reference to specific example of FIG. 7 in which the priority is calculated by the second priority calculation algorithm as described above.

Figure 7:
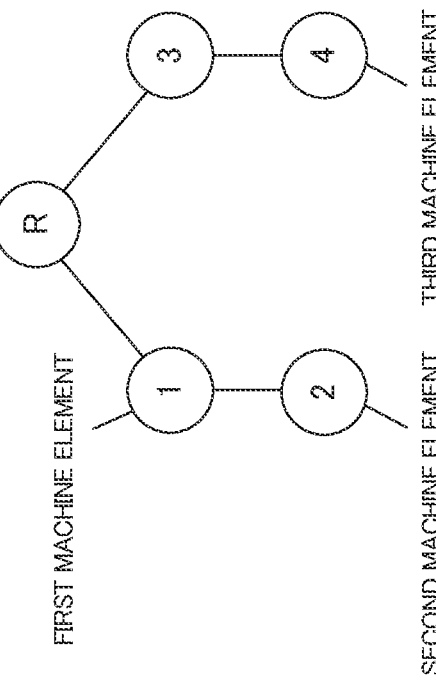
FIG. 7 is a diagram for explaining a procedure for calculating a priority using a second priority calculation algorithm.

FIG. 7 is a diagram for explaining a procedure for calculating the priority using the second priority calculation algorithm. A left side in FIG. 7 shows an example of machine element-control axis linkage information and individual axis dependency information, and a right side in FIG. 7 shows various parameters calculated by the priority calculation unit 54*b* under such a configuration.

In the example shown on the left side in FIG. 7, the machine tool can move a first machine element, a second machine element, and a third machine element along a first control axis, a second control axis, a third control axis, and a fourth control axis. In the example on the left side in FIG. 7, it is assumed that all of the first control axis, the second control axis, the third control axis, and the fourth control axis are rectilinear axes. In the example of the individual axis dependency shown on the left side in FIG. 7, the first and second control axes can move independently of the third and fourth control axes. Further, the second control axis is subordinate to the first control axis, and the fourth control axis is subordinate to the third control axis. In the example of the machine element-control axis linkage information shown on the left side in FIG. 7, the first machine element is linked with the first control axis, the second machine element is linked with the second control axis, and the third machine element is linked with the fourth control axis.

In the example shown on the left side in FIG. 7, the machine tool includes the first to fourth control axes. Therefore, two control axes selected from the first to fourth control axes can be combined to form a total of six axis pairs, for example, the axis pair of the first and second control axes, the axis pair of the first and third control axes, the axis pair of the first and fourth control axes, the axis pair of the second and third control axes, the axis pair of the second and fourth control axes, and the axis pair of the third and fourth control axes. Further, FIG. 7 shows examples of a case where the relative axis stroke between the first control axis and the second control axis is 4, a case where the relative axis stroke between the first control axis and the third control axis is 5, a case where the relative axis stroke between the first control axis and the fourth control axis is 3, a case where the relative axis stroke between the second control axis and the third control axis is 1, a case where the relative axis stroke between the second control axis and the fourth control axis is 6, and a case where the relative axis stroke between the third control axis and the fourth control axis is 2. In other words, in the example of FIG. 7, the relative axis stroke increases in the order of the axis pair of the second and third control axes, the axis pair of the third and fourth control axes, the axis pair of the first and fourth control axes, the axis pair of the first and second control axes, the axis pair of the first and third control axes, and the axis pair of the second and fourth control axes.

As shown in FIG. 7, the first and fourth control axes are linked with the combination of the first and third machine elements, the first and second control axes are linked with the combination of the first and second machine elements, and the second and fourth control axes are linked with the combination of the second and third machine elements. Therefore, when the priority is calculated for each of the check target sets including the combination of the machine elements linked with each of the axis pairs by the machine element-control axis linkage information in descending order from the axis pair with the largest relative axis stroke, the combination of the second and third machine elements is given a first rank, the combination of the first and second machine elements is given a second rank, and the combination of the first and third machine elements is given a third rank.

<Third Priority Calculation Algorithm>

Under a third priority calculation algorithm, the priority calculation unit 54*b* calculates the priority for the plurality of check target sets, based on the axis stroke vector of each of the control axes and the pre-movement position vector of each of the machine elements transmitted from the position/ attitude calculation unit 35. More specifically, the priority calculation unit 54*b* calculates a reduction rate parameter proportional to a reduction rate of a distance between two machine elements constituting each of the check target set, based on the axis stroke vector of each of the control axes, the pre-movement position vector of each of the machine elements, and the machine element-control axis linkage information, and calculates the priority for each of the check target set based on such a reduction rate parameter.

A procedure for calculating the reduction rate parameter for each of the check target set will be described below. First, the priority calculation unit 54*b* acquires the axis stroke vectors of the control axes transmitted from the position/ attitude calculation unit 35, and calculates velocity vectors of the machine elements linked with the control axes by the machine element-control axis linkage information, based on these axis stroke vectors. Here, for the rectilinear machine elements linked with the rectilinear axis, the axis stroke vector is used as the velocity vector as it is. Further, for the rotary machine elements linked with the rotary axis, a cross product of the axis stroke vector and a predetermined radius vector is used as the velocity vector. An example of the radius vector used herein includes a radius vector predetermined for each rotary axis. More specifically, a direction of the radius vector is a radius direction orthogonal to the rotary axis, and a norm of the radius vector is a distance in the radius direction from the rotary axis to the machine element.

Next, the priority calculation unit 54*b* acquires the pre-movement position vectors of the machine elements transmitted from the position/attitude calculation unit 35, and calculates a relative position vector normalized for two machine elements constituting each of the check target sets, based on these pre-movement position vector. Here, when the pre-movement position vector of the n-th machine element is rn and the pre-movement position vector of the m-th machine element is rm, a relative position vector normalized for a combination of the n-th machine element and the m-th machine element is (rn−rm)/|rn−rm|.

Next, the priority calculation unit 54*b* calculates a relative velocity vector for two machine elements constituting each of the check target sets, based on the velocity vector for each of the machine elements which is previously calculated. Here, when the velocity vector of the n-th machine element is vn and the velocity vector of the m-th machine element is vm, a relative velocity vector for the combination of the n-th machine element and the m-th machine element is vn−vm.

Next, the priority calculation unit 54*b* multiplies an inner product of the relative velocity vector and the relative position vector, which are previously calculated, by a negative sign to calculate a reduction rate parameter for each of the check target sets. Here, when the check target set is constituted with the n-th machine element and the m-th machine element, the reduction rate parameter is −(vn−vm)·(rn−rm)/|rn−rm|. The reduction rate parameter calculated by the above procedure is proportional to the reduction rate per unit time of the distance between two machine elements. In other words, the reduction rate parameter becomes 0 when the distance between two machine elements does not change, the reduction rate parameter becomes negative value when the distance between two machine elements changes in a direction of increasing, and the reduction rate parameter becomes positive when the distance between two machine elements changes in a direction of getting closer.

Next, the priority calculation unit 54*b* calculates the priority in descending order from the check target set including the combination of the machine elements having the large reduction rate parameter calculated by the above procedure. In other words, under the third priority calculation algorithm, the priority calculation unit 54*b* determines that there is a high possibility of interference in the check target set in which the reduction rate in the distance between two components is large, and makes the priority of the check target set including the combination of these machine elements high.

A specific procedure will be described with reference to specific example of FIG. 8 in which the priority is calculated by the third priority calculation algorithm as described above.

Figure 8:
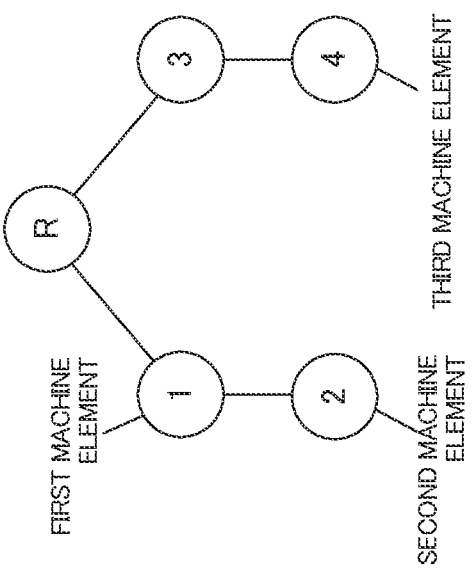
FIG. 8 is a diagram for explaining a procedure for calculating a priority using a third priority calculation algorithm.

FIG. 8 is a diagram for explaining a procedure for calculating the priority using the third priority calculation algorithm. A left side in FIG. 8 shows an example of machine element-control axis linkage information and individual axis dependency information, and a right side in FIG. 8 shows various parameters calculated by the priority calculation unit 54$b$ under such a configuration. In addition, a configuration of the machine tool shown on the left side in FIG. 8 is the same as that shown on the left side in FIG. 7, and thus will not be described in detail.

In the example of FIG. 8, it is assumed that a velocity vector of a first machine element linked with a first control axis is v1, a velocity vector of a second machine element linked with a second control axis is v2, a velocity vector of a third machine element linked with a fourth control axis is v3, a pre-movement position vector of the first machine element is r1, a pre-movement position vector of the second machine element is r2, and a pre-movement position vector of the third machine element is r3. Further, in the example of FIG. 8, it is assumed that a relative velocity vector v1–v2 for the combination of the first and second machine elements is (0, 0, 1), a relative velocity vector v1–v3 for the combination of the first and third machine elements is (0, 2, 0), a relative velocity vector v2–v3 for the combination of the second and third machine elements is (1, 0, 0), a relative position vector r1–r2 normalized for the combination of the first and second machine elements is (0, 0, –1), a relative position vector r1–r3 normalized for the combination of the first and third machine elements is (0, 0, 1), and a relative position vector r2–r3 normalized for the combination of the second and third machine elements is (1, 0, 0).

Therefore, when the reduction rate parameter for each combination of the machine elements is calculated according to the above procedure, the reduction rate parameter for the combination of the first and second machine elements is 1, the reduction rate parameter for the combination of the first and third machine elements is 0, and the reduction rate parameter for the combination of the second and third machine elements is –1. Therefore, when the priority is calculated in descending order from the check target set including the combination of the machine elements with a large reduction rate parameter, the combination of the first and second machine elements is given a first rank, the combination of the first and third machine elements is given a second rank, and the combination of the second and third machine elements is given a third rank.

Returning to FIG. 1, the priority calculation unit 54$b$ calculates the priority for the plurality of check target sets extracted by the check target set extraction processing in the check target set extraction unit 54$a$, based on any one of the first to third priority calculation algorithms described above or the priority calculation algorithm obtained by the combination of these algorithms, and additionally writes the calculated priority in the check target set list in the third storage unit 53. Thus, the priority is assigned to the plurality of check target sets extracted by the check target set extraction unit 54$a$.

As described above, the interference check assistance device 5 extracts the check target set from all the combinations of the plurality of machine elements, based on the axis stroke vector and the pre-movement position vector transmitted from the position/attitude calculation unit 35, assigns the priority to these check target sets, and causes the third storage unit 53 to store the check target set list assigned with the priority as the interference check assistance information (for example, see FIG. 9).

The interference check unit 36 acquires the post-movement position vector and the post-movement attitude information transmitted from the position/attitude calculation unit 35 every interpolation period, and the interference check assistance information stored in the third storage unit 53. Further, the interference check unit 36 performs the interference check computation on the plurality of check target sets determined by the acquired interference check assistance information, in order from the check target set with the highest priority.

According to the present embodiment, the following effects are achieved. The check target set extraction unit 54$a$ extracts one or more check target sets from all the combinations of the plurality of machine elements constituting the machine tool 2, based on the movement pulse in the numerical controller 3, the machine element-control axis linkage information for linking each of the control axes in the machine tool 2 with the machine element moving along such a control axis among the plurality of machine elements, and the individual axis dependency information for defining the dependency between the control axes in the machine tool 2. Thus, it is possible to extract the check target set by excluding the combination of the machine elements that obviously do not interfere (for example, the combination of the machine elements moving together along the control axes based on the movement pulse) from all the combinations of the plurality of machine elements. Further, the numerical controller 3 moves the plurality of machine elements along the plurality of control axes based on the movement pulse, and performs the interference check computation on the check target set extracted by the check target set extraction unit 54$a$. According to the present embodiment, since the check target set subjected to the interference check computation can be narrow down to only the combination of the non-obvious machine elements that do not interfere, the interference check computation can be completed in a short time compared with a case where the numerical controller 3 performs the interference check computation on all the combinations.

The check target set extraction unit 54$a$ specifies the control axis to be moved based on the movement pulse as the movement control axis, classifies the machine elements linked with the movement control axis and the control axis subordinate to the movement control axis into the dependent machine element group, based on the machine element-control axis linkage information and the individual axis dependency information, classifies the machine elements not belonging to the dependent machine element group among all of the machine elements into the stationary machine element group, and extracts the check target set by combining the machine elements belonging to the dependent machine element group and the machine elements belonging to the stationary machine element group. Thus, it is possible to narrow down the check target set subjected to the interference check computation to only the combination of the non-obvious machine elements that do not interfere by a simple computation.

When the movement control axis includes a plurality of movement control axes, the check target set extraction unit 54$a$ extracts the union of the combinations of the machine elements under each of the movement control axes, as a check target set. Thus, it is possible to appropriately narrow down the check target set even when the machine elements are simultaneously moved along the plurality of control axes.

The check target set extraction unit 54*a* stores the information on the extracted check target set as the interference check assistance information in the third storage unit 53, and the interference check unit 36 performs the interference check computation with reference to the interference check assistance information stored in the third storage unit 53. Thus, the check target set extraction unit 54*a* can perform the computation for extracting the check target set at a free timing independent of the interference check computation in the interference check unit 36.

In the present embodiment, the interference check assistance device 5 including the function of generating the interference check assistance information is incorporated into the numerical controller 3 that performs the control of the machine tool 2 and the interference check computation, and the interference check assistance device 5 generates the interference check assistance information based on the movement pulse transmitted from the pulse generation unit 34 of the numerical controller 3. Thus, although the computation load on the numerical controller 3 increases, the interference check assistance information can be generated in real time while the numerical controller 3 controls the machine tool 2. Therefore, even when the machine tool 2 is manually operated by an operator, for example, it is possible to generate appropriate interference check assistance information.

Second Embodiment

Next, a numerical control system according to a second embodiment of the present disclosure will be described. In the following description, the same components as those of the numerical control system according to the first embodiment are denoted by the same reference numerals, and will not be described in detail.

Figure 10:
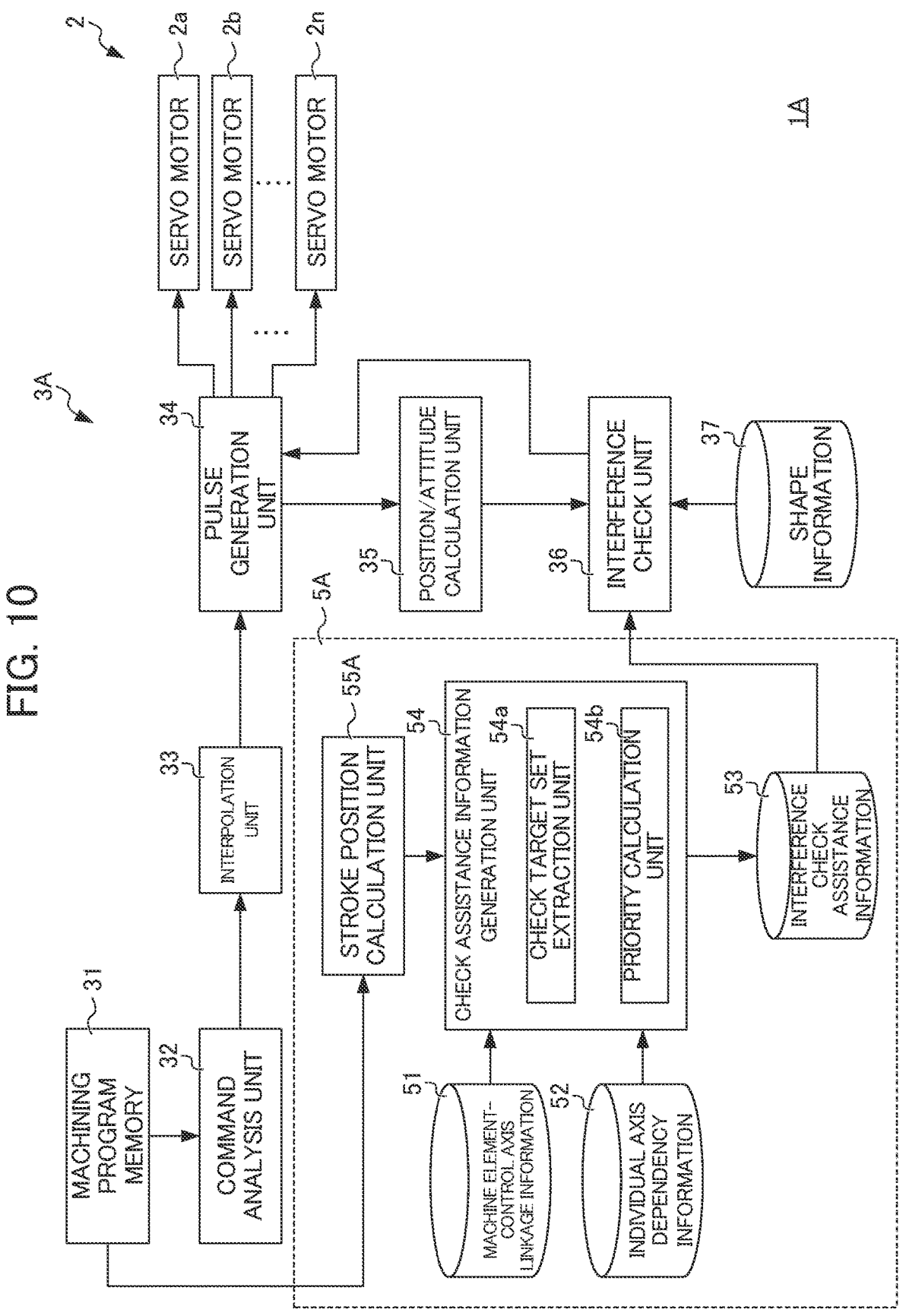
FIG. 10 is a schematic diagram of a numerical control system according to a second embodiment of the present disclosure.

FIG. 10 is a schematic diagram of a numerical control system 1A according to the present embodiment. As described above, the case has been described in the first embodiment in which the interference check assistance device 5 is incorporated into the numerical controller 3. On the other hand, the numerical control system 1A according to the present embodiment differs from the numerical control system 1A according to the first embodiment in that including a numerical controller 3A and an interference check assistance device 5A configured separately from the numerical controller 3A.

The interference check assistance device 5A includes a first storage unit 51, a second storage unit 52, a check assistance information generation unit 54, and a stroke position calculation unit 55A.

The stroke position calculation unit 55A reads out the numerical control program stored in the machining program memory 31, and generates an axis stroke vector of each of control axes and a pre-movement position vector of each of machine elements in the same period as the interpolation period in the numerical controller 3 according to the same procedure as the computation in the command analysis unit 32, the interpolation unit 33, the pulse generation unit 34, and the position/attitude calculation unit 35 of the numerical controller 3. The stroke position calculation unit 55A transmits the generated axis stroke vector and pre-movement position vector to the check assistance information generation unit 54. Since the procedure for generating the interference check assistance information in the check assistance information generation unit 54 based on the axis stroke vector and the pre-movement position vector transmitted from the stroke position calculation unit 55A is the same as in the first embodiment, a detailed description thereof will not be given.

In the present embodiment, the interference check assistance device 5A is configured separately from the numerical controller 3A to generate the interference check assistance information based on the numerical control program stored in the machining program memory 31. Thus, before the numerical controller 3A starts to control the machine tool 2, more specifically, when the numerical control program is created, the interference check assistance information can be generated based on the numerical control program. Therefore, according to the numerical control system 1 of the present embodiment, it is possible to reduce the computation load on the numerical controller 3A at the time of controlling the machine tool 2, compared with the numerical control system 1 according to the first embodiment.

The present disclosure is not limited to the above-described embodiments, and various modifications and changes can be made. For example, the case has been described in the first embodiment in which the check assistance information generation unit 54 stores the generated check assistance information in the third storage unit 53 and the interference check unit 36 reads the check assistance information stored in the third storage unit 53 and performs the interference check computation, but the present invention is not limited thereto. The check assistance information generated by the check assistance information generation unit 54 may be transmitted to the interference check unit 36 without using the third storage unit 53.

EXPLANATION OF REFERENCE NUMERALS 1, 1A . . . numerical control system
2 . . . machine tool
3, 3A . . . numerical controller
31 . . . machining program memory
32 . . . command analysis unit
33 . . . interpolation unit
34 . . . pulse generation unit
35 . . . position/attitude calculation unit
36 . . . interference check unit
37 . . . shape storage unit
5, 5A . . . interference check assistance device
51 . . . first storage unit
52 . . . second storage unit
53 . . . third storage unit
54 . . . check assistance information generation unit
54*a* . . . check target set extraction unit
54*b* . . . priority calculation unit
55A . . . stroke position calculation unit

The invention claimed is:

1. A numerical control system comprising: a numerical controller that causes a plurality of machine elements of a machine tool to move along a plurality of axes based on a movement command and performs an interference check computation between two machine elements that are combined by a predetermined check target set; and
    an interference check assistance device that assists the interference check computation,
    the interference check assistance device including
    a first memory configured to store first information for linking each of the axes in the machine tool with a machine element, which moves along a corresponding axis, among the plurality of machine elements, a second memory configured to store second information for defining dependency between the axes in the machine tool, and a processor configured to extract one or more of the check target set by excluding combinations which do not require to execute the interference check computation from all combinations of the plurality of machine elements, based on the movement command, the first information, and the second information.

2. The numerical control system according to claim 1, further comprising a third memory configured to store information on the check target set extracted by the processor, wherein the numerical controller refers to the information on the check target set stored in the third memory, and performs the interference check computation.

3. The numerical control system according to claim 1, wherein the second memory stores the second information in a machine configuration tree format.

4. A numerical control system comprising: a numerical controller that causes a plurality of machine elements of a machine tool to move along a plurality of axes based on a movement command and performs an interference check computation between two machine elements that are combined by a predetermined check target set; and an interference check assistance device that assists the interference check computation, the interference check assistance device including a first memory configured to store first information for linking each of the axes in the machine tool with a machine element, which moves along a corresponding axis, among the plurality of machine elements, a second memory configured to store second information for defining dependency between the axes in the machine tool, and a processor configured to extract one or more of the check target set from all combinations of the plurality of machine elements, based on the movement command, the first information, and the second information, wherein the processor is configured to:

specify the axis, along which the machine element moves based on the movement command, as a movement axis, classify machine elements linked with the movement axis and an axis subordinate to the movement axis into a dependent machine element group, based on the first information and the second information, classify machine elements not belonging to the dependent machine element group among all of the machine elements into a stationary machine element group, and extract the check target set by combining the machine elements belonging to the dependent machine element group and the machine elements belonging to the stationary machine element group.

5. The numerical control system according to claim 4, wherein when the movement axis comprises a plurality of movement axes, the processor extracts a union of combinations of the machine elements under each of the movement axes, as the check target set.

6. An interference check assistance method in which a numerical controller assists an interference check computation, the numerical controller being configured to cause a plurality of machine elements of a machine tool to move along a plurality of axes based on a movement command and to perform an interference check computation between two machine elements that are combined by a check target set, the method comprising:

acquiring the movement command, first information for linking each of the axes in the machine tool with a machine element, which moves along a corresponding axis, among the plurality of machine elements, and second information for defining dependency between the axes in the machine tool; and extracting one or more of the check target set by excluding combinations which do not require to execute the interference check computation from all combinations of the plurality of machine elements, based on the movement command, the first information, and the second information.

* * * * *